United States Patent
Zhao et al.

(10) Patent No.: US 12,214,424 B2
(45) Date of Patent: Feb. 4, 2025

(54) HIGH-THROUGHPUT PREPARATION DEVICE FOR METAL FIBER BASED ON MULTI POWDER AND METAL FIBER PREPARATION METHOD USING THE DEVICE

(71) Applicant: SOUTHERN UNIVERSITY OF SCIENCE AND TECHNOLOGY, Shenzhen (CN)

(72) Inventors: Fu Zhao, Shenzhen (CN); Xiaodong Xiang, Shenzhen (CN); Xianglin Wang, Shenzhen (CN); Guang Feng, Shenzhen (CN)

(73) Assignee: Southern University of Science and Technology, Shenzhen (CN)

( * ) Notice: Subject to any disclaimer, the term of this patent is extended or adjusted under 35 U.S.C. 154(b) by 1260 days.

(21) Appl. No.: 16/957,966

(22) PCT Filed: Jan. 7, 2020

(86) PCT No.: PCT/CN2020/070669
§ 371 (c)(1),
(2) Date: Jun. 25, 2020

(87) PCT Pub. No.: WO2021/114449
PCT Pub. Date: Jun. 17, 2021

(65) Prior Publication Data
US 2023/0092989 A1     Mar. 23, 2023

(30) Foreign Application Priority Data
Dec. 10, 2019   (CN) .......................... 201911261567.3

(51) Int. Cl.
*B22F 12/13*    (2021.01)
*B22F 5/12*     (2006.01)
(Continued)

(52) U.S. Cl.
CPC ................. *B22F 12/13* (2021.01); *B22F 5/12* (2013.01); *B22F 10/22* (2021.01); *B22F 12/57* (2021.01);
(Continued)

(58) Field of Classification Search
CPC .......... B22F 10/22; B22F 12/13; B22F 12/20; B22F 12/57; B22F 12/58;
(Continued)

(56) References Cited

U.S. PATENT DOCUMENTS 10,562,098 B2    2/2020  Wang et al.
10,913,110 B2    2/2021  Li et al.
(Continued)

FOREIGN PATENT DOCUMENTS

CN     105903962 A     8/2016
CN     105954074 A     9/2016
(Continued)

OTHER PUBLICATIONS

CN105970011A English language translation (Year: 2016).*
(Continued)

*Primary Examiner* — Philip C Tucker
*Assistant Examiner* — Jimmy R Smith, Jr.
(74) *Attorney, Agent, or Firm* — KDW Firm PLLC

(57) ABSTRACT

Disclosed are a high-throughput preparation device for metal fiber based on multi powder and a method for preparing a metal fiber using the device. The high-throughput preparation device includes a metal powder conveying system, a metal powder mixing system, a metal powder melting system and a metal fiber forming system which are connected in sequence, where the metal powder melting system includes an induction powder melting device and a laser powder melting device which are independently disposed. The method for preparing a metal fiber using the high-
(Continued)

throughput preparation device includes four steps: powder conveying, powder mixing, melting and forming.

19 Claims, 2 Drawing Sheets

(51) Int. Cl.
    *B22F 10/22*     (2021.01)
    *B22F 12/20*     (2021.01)
    *B22F 12/57*     (2021.01)
    *B22F 12/58*     (2021.01)
    *B23K 26/354*     (2014.01)

(52) U.S. Cl.
    CPC ............ *B22F 12/58* (2021.01); *B23K 26/354* (2015.10); *B22F 12/20* (2021.01)

(58) Field of Classification Search
    CPC .......... B22F 2003/1053; B22F 2207/01; B22F 3/20; B22F 5/12; B22F 2003/1054; B22F 3/105; B22F 12/41; B22F 2003/208; B23K 26/354; Y02P 10/25
    USPC .......................... 425/79, 78; 164/493, 48, 47
    See application file for complete search history.

(56) References Cited

U.S. PATENT DOCUMENTS

2003/0127776 A1    7/2003    Carlson
2019/0054521 A1    2/2019    Li

FOREIGN PATENT DOCUMENTS

| | | |
|---|---|---|
| CN | 105970011 A | 9/2016 |
| CN | 107502765 A | 12/2017 |
| CN | 107855531 A | 3/2018 |
| CN | 108097956 A | 6/2018 |
| CN | 108214804 A | 6/2018 |
| CN | 108273999 A | 7/2018 |
| CN | 109226766 A | 1/2019 |
| CN | 110039054 A | 7/2019 |
| CN | 110339742 A | 10/2019 |
| CN | 211161924 | 8/2020 |
| JP | H0584420 A | 4/1993 |
| JP | H07185287 A | 7/1995 |
| JP | 2015/113275 A | 6/2015 |
| JP | 2017077578 A * | 4/2017 |
| WO | 2010105502 A1 | 9/2010 |

OTHER PUBLICATIONS

Metals Handbook, 9th Edition, vol. 7, American Society for Metals, Metals Park, Ohio, Jun. 30, 1994, 3 pages.

Wang, Yungan et al., Three-dimensional Printing Technology, Jul. 31, 2013, 3 pages.

Chinese Office Action for Application No. 201911261567 dated Mar. 31, 2023.

International Search Report for Application No. PCT/CN2020/070669 dated Aug. 14, 2020.

* cited by examiner

HIGH-THROUGHPUT PREPARATION DEVICE FOR METAL FIBER BASED ON MULTI POWDER AND METAL FIBER PREPARATION METHOD USING THE DEVICE

TECHNICAL FIELD

The present application relates to the field of metal fiber preparation and processing, and relates to a high-throughput preparation device for metal fiber based on multi powder and a method for preparing a metal fiber by using the device.

BACKGROUND

Structural materials are materials used for manufacturing stress components based on their mechanical properties. Among them, metal structural materials such as high-performance alloys and steel materials, due to excellent mechanical properties, are widely used for producing high-end equipment and elements which are associated with national interests and people's livelihood, such as aircraft engines, gas turbines for power generation, steam turbines, high-speed rails, automobiles and the like. With the advances of science and technology, the research and development work on metal structure materials with better performance is increasingly urgent. However, the conventional research and development method for a metal structural material using a bulk material as a main sample form often prepares and characterizes a bulk material sample only for one alloy component ratio in one experiment. It is difficult to acquire a large number of comparable material samples in a short time during the preparation phase of the bulk material sample, and to acquire and analyze a large number of mechanical property experimental data during the characterization phase of the bulk material sample, so that the research and development process of the metal structure material is time-consuming, labor-consuming, inefficient, slow in development and high in cost.

The combinatorial chemistry approach was emerged in the mid-1980s, and has penetrated into a number of chemical fields, including pharmaceuticals, organic chemistry, materials, analytical chemistry and the like. With the increase of automation level, the combinatorial chemistry approach with high throughput as a remarkable feature has become one of the most active fields of chemistry at present. The application of the combinatorial chemistry approach to the field of materials science is called combinatorial materials science. At present, the combined materials approach is mainly used for preparing functional materials in a thin film form, such as a chip, but is not suitable for high-throughput screening of mechanical properties of metal structure materials.

For the problems such as time and labor consumption, low efficiency, slow development and high cost in the research and development process of the metal structure material, it is especially important to develop a high-throughput preparation device and a method for preparing a metal structural material using the device. To this end, researchers have made relevant research. For example, CN107855531A discloses a method for hot pressing sintering powder metallurgy high-throughput preparing of metal matrix composite, and realizes the simultaneous preparation of various kinds or even hundreds of kinds of metal matrix composite samples simultaneously through the process innovation of soft-breaking cells and hard-breaking faults. However, this method is still used for producing the bulk material sample, and has the disadvantages of high cost, low continuity and incapability of continuously changing the components of the bulk material. CN107502765A discloses a high-throughput micro-manufacturing method for multi-component materials, and according to the method, by utilizing a microwave energy field is for heating, one-time high-throughput sintering fusion preparing or high-throughput heat treatment of the materials under the different temperature gradient fields are achieved. Although the method prepares bulk material samples with smaller sizes, the method still has the disadvantages of low continuity and difficulty in gradient change of bulk material components due to the limitation of the number of sample sinks in the array crucible used by the method.

Although the existing art disclosed above develops methods for preparing a metal structural material, the methods are limited to a bulk material sample, and the high-throughput problems of high cost, low continuity and difficulty in gradient change of bulk material components are not really solved. Therefore, it is an urgent problem to be solved at present to develop a metal fiber capable of both reducing the cost and realizing continuous gradient change in composition so as to realize high-throughput preparation.

SUMMARY

The following is a summary of the subject matter described herein in detail. This summary is not intended to limit the scope of the claims.

The present application provides a high-throughput preparation device for metal fiber based on multi powder. The device includes an induction powder melting device and a laser powder melting device which are independently disposed. A method for preparing a metal fiber using said high-throughput preparation device including four steps: powder conveying, powder mixing, melting and forming, can produce the metal fiber capable of both reducing the cost and realizing the metal fiber material with a continuous gradient change in composition, thereby realizing the high-throughput preparation.

To achieve the object, the present application adopts the following technical solutions.

One object of the present application is to provide a high-throughput preparation device for metal fiber based on multi powder. The device includes a metal powder conveying system, a metal powder mixing system, a metal powder melting system and a metal fiber forming system which are connected in sequence.

Wherein, the metal powder melting system includes an induction powder melting device and a laser powder melting device which are independently disposed.

The high-throughput preparation device for metal fiber based on multi powder provided in the present application can sufficiently melt a variety of metal powder materials within different composition ranges through the induction powder melting device and the laser powder melting device separately disposed, thereby realizing the melting of metal powders of various compositions or materials in a wider temperature range, and making the produced metal fiber achieve the characteristics of continuous gradient change in composition.

As an optional technical solution of the present application, the metal powder conveying system includes a plurality of single-channel powder conveying devices. The number of the single-channel powder conveying devices is optionally 2 to 20, for example, 2, 5, 7, 10, 15, 18 or 20, etc., but the number is not limited to the listed values, and other values unlisted within this value range are also applicable.

With a non-return valve, the single-channel powder conveying device provided in the present application realizes one-way conveying of the metal powders from the metal powder conveying system to the metal powder mixing system.

Optionally, a mass flow controller is configured to implement feedback control of a powder feeding amount of the metal powder conveying system.

Optionally, the mass flow controller has a precision of ±0.1 g/min.

The mass flow controller, due to its precision reaching ±0.1 g/min, can ensure the realization of preset ratios at high precision, thereby affording the basic guarantee for the preparation of the metal fiber with continuous gradient chang in composition.

Optionally, the metal powder conveying system includes a pneumatic rotary table powder feeder.

Optionally, the pneumatic rotary table powder feeder includes a powder cylinder, a powder feeding plate, a pneumatic motor and a powder outlet.

The pneumatic rotary table powder feeder provided in the present application uses the pneumatic motor to drive the powder feeding plate, and uses argon as a shielding gas. Under the dual action of rotation of the powder feeding plate and airflow of the shielding gas, the metal powders are dispersed evenly and conveyed smoothly.

As an optional technical solution of the present application, the metal powder mixing system includes a powder mixing device and a powder storing device which are connected in sequence.

Optionally, a powder inlet of the powder mixing device is connected to the powder outlet of the metal powder conveying system.

Optionally, the powder inlet of the powder mixing device and the powder outlet of the metal powder conveying system are connected through a powder feed pipe.

Optionally, the mass flow controller is disposed on the powder feeding pipe.

Optionally, the powder mixing device includes a powder inlet and a rotating blade stirrer.

Optionally, the powder storing device includes a powder receiver and a static mixer.

Optionally, the powder receiver is funnel-shaped.

Optionally, the static mixer is a stirring paddle with rotating blades.

Optionally, the static mixer is welded on an inner wall of the powder storage device through two metal rods, and the central axes of the static mixer and the powder storage device are overlapped.

Through the collaboration action of the rotating blade stirrer and the static mixer provided in the present application, the atmospheric pressure of the multi-path powder feeding pipe can be balanced so as to guarantee the stability of powder feeding, and the pneumatic mixture of metal powders of different components can be realized under the airflow effect, so as to guarantee the complete mixture of metal powders.

As an optional technical solution of the present application, the metal powder mixing system and the metal powder melting system are connected through a powder conveying pipe.

Optionally, a powder melting switching device is configured to implement switching between the induction powder melting device and the laser powder melting device.

The induction powder melting device provided in the present application uses a high frequency induction coil, with the frequency of alternating current higher than 20 KHz, and the high frequency induction coil has advantages of uniform heating, small temperature difference and high temperature control precision.

The laser melting powder device provided in the present application has advantages of high concentration of energy, small melting pool and heat affected zone, and no need of vacuum in melting environment, which can improve the powder melting efficiency.

Optionally, the powder melting switching device is a valve with a manual lever.

The powder melting switch device provided in the present application can quickly switch between the parallel induction powder melting device and laser powder melting device through the valve with a manual lever, thereby extending the application range of the high-throughput preparation device.

Optionally, the induction powder melting device includes a powder storing chamber and an induction coil melting chamber.

Optionally, the laser powder melting device includes a laser melting chamber and a laser device.

Optionally, an induction preheating coil is disposed on the powder conveying pipe connected to the laser powder melting device.

The induction preheating coil provided in the present application can preheat the evenly mixed metal powders, thereby maximizing the use of the laser, improving the laser heating efficiency, and ensuring that the metal powders can be fully melted into liquid metal.

Optionally, a laser beam emitted by the laser device is a continuously tunable laser beam.

Optionally, an angle between the laser beam emitted by the laser device and a central axis of an inlet of the powder conveying pipe is 50° to 80°, for example, 50°, 55°, 60°, 65°, 70°, 75° or 80°, etc., but the angle is not limited to the listed values, and the other values unlisted within this value range are also applicable. The angle is optionally 75°.

In the present application, the angle between the laser beam and the central axis of the inlet of the powder conveying pipe is set to be 50° to 80°, which can not only enable metal powder to flow smoothly under the collaboration action of its own gravity and powder conveying atmospheric pressure, but also ensure the metal powder has sufficient time to be preheated by the induction preheating coil, thereby avoiding the problem that the metal powders are insufficiently preheated, and solving the problem that the metal powders consolidate into blocks on the powder conveying pipe due to overlong preheating time.

As an optional technical solution of the present application, the metal fiber forming system includes a vacuum protective chamber, a servo motor, a mandrel, a rotary forming disk and a cooling system.

Optionally, the rotary forming disk includes a rotary drawing disk and/or a rotary extrusion dual disk.

The metal fiber forming system provided in the present application includes a cantilever structure. A mounting shaft of the rotary forming disk is provided with a rotary sealing structure, and is connected to a cooling control system, so that the molten metal is cooled on the rotary forming disk driven by the servo motor and is drawn into continuous filiform or long-strip-shaped metal fibers with gradient change in composition, and the cooling speed of the molten liquid metal can be controlled, thereby realizing the high-throughput preparation under different cooling process conditions.

Another object of the present application is to provide a method for preparing a metal fiber using the high-throughput preparation device. The method includes the following steps:

(1) Metal powders of various components are conveyed to the metal powder mixing system in preset ratios through the metal powder conveying system;
(2) The metal powders are evenly mixed in the metal powder mixing system and conveyed to the metal powder melting system;
(3) In the metal powder melting system, the evenly mixed metal powders are melted using the induction powder melting device or the laser powder melting device, and the molten metal obtained by melting is conveyed to the metal fiber forming system; and
(4) The molten metal is prepared into a metal fiber with a gradient change in composition through the metal fiber forming system.

As an optional solution of the present application, the metal powder in the step (1) has a particle size ranging from 50 μm to 200 μm, for example, 50 μm, 70 μm, 100 μm, 120 μm, 150 μm, 180 μm or 200 μm, etc., but the particle size is not limited to the listed values, and the other values unlisted within this value range are also applicable.

Optionally, the metal powder conveying system in step (1) has a powder feeding efficiency of 2 g/min to 10 g/min, for example, 2 g/min, 5 g/min, 7 g/min, 9 g/min or 10 g/min, etc., but the powder feeding efficiency is not limited to the listed values, and other unlisted values within this value range are also applicable.

Optionally, the mixing manner in the step (2) includes a pneumatic manner and/or stirring.

Optionally, the metal fiber in the step (4) is a continuous elongated material with a cross section.

Optionally, the metal fiber in step (4) is a wire or a strip with a circular or rectangular cross section.

Optionally, the metal fiber in step (4) has a cross-sectional size of 2 mm$^2$ to 5 mm$^2$, for example, 2 mm$^2$, 2.5 mm$^2$, 3 mm$^2$, 3.5 mm$^2$, 4 mm$^2$, 4.5 mm$^2$ or 5 mm$^2$, etc., but the cross-sectional size is not limited to the listed values, and other values unlisted within this value range are also applicable.

As an optional technical solution of the present application, the step of melting the evenly mixed metal powders using the induction powder melting device in step (3) includes: conveying the evenly mixed metal powders to the powder storing chamber, and conveying the evenly mixed metal powders to the induction coil melting chamber for heating and melting.

As an optional technical solution of the present application, the step of melting the evenly mixed metal powders using the laser powder melting device in the step (3) includes: conveying the evenly mixed metal powders to the powder conveying pipe of the induction preheating coil for preheating, and conveying the preheated metal powders to the laser melting chamber for heating and melting.

As an optional technical solution of the present application, the preparation method includes the following steps:

(1) various metal powders with a particle size of 50 μm to 200 μm are conveyed to the metal powder mixing system in preset ratios through the metal powder conveying system at a powder feeding efficiency of 2 g/min to 10 g/min, where powder feeding precision is ±0.1 g/min;
(2) The metal powders are evenly mixed in a pneumatic manner and/or by stirring in the metal powder mixing system, the evenly mixed metal powders are conveyed to the funnel-shaped powder receiver and compacted by gravity, then the compacted metal powders are conveyed to the metal powder melting system;
(3) In the metal powder melting system, the step of melting the evenly mixed metal powders using the induction powder melting device includes: conveying the evenly mixed metal powders to the powder storing chamber, and conveying the evenly mixed metal powders to the induction coil melting chamber for heating and melting;

alternatively, the step of melting the evenly mixed metal powder using the laser powder melting device includes: conveying the evenly mixed metal powders to the powder conveying pipe of the induction preheating coil for preheating, conveying the preheated metal powders to the laser melting chamber for heating and melting;

(4) The molten metal is prepared by the rotary forming disk into a continuous elongated metal fiber with a cross-sectional size of 2 mm$^2$ to 5 mm$^2$ through the metal fiber forming system.

Compared with the related art, the present application has the following beneficial effects.

(1) The high-throughput preparation device of the present application has a simple structure and is convenient to operate, and also can process various metal types such as nickel-based, iron-based, magnesium-based, and aluminum-based, etc., thereby expanding the application scope.
(2) The high-throughput preparation device of the present application can be used for preparing metal fibers, which can both reduce the cost and realize continuous gradient change in composition, thereby realizing the high-throughput preparation.
(3) The high-throughput preparation device of the present application can be used for preparing continuous elongated metal fibers with a cross section, and the metal fibers have the features of uniform radial component distribution and continuous axial component change.
(4) The high-throughput preparation device of the present application can be used for preparing band metal fibers with a rectangular cross section, which not only can be directly used in the tensile test, but also can be directly used in the test for components, textures and other mechanical properties, realizing quick, convenient high-throughput characteristics.

Other aspects can be understood upon reading and understanding the drawings and the detailed description.

Figure 1:
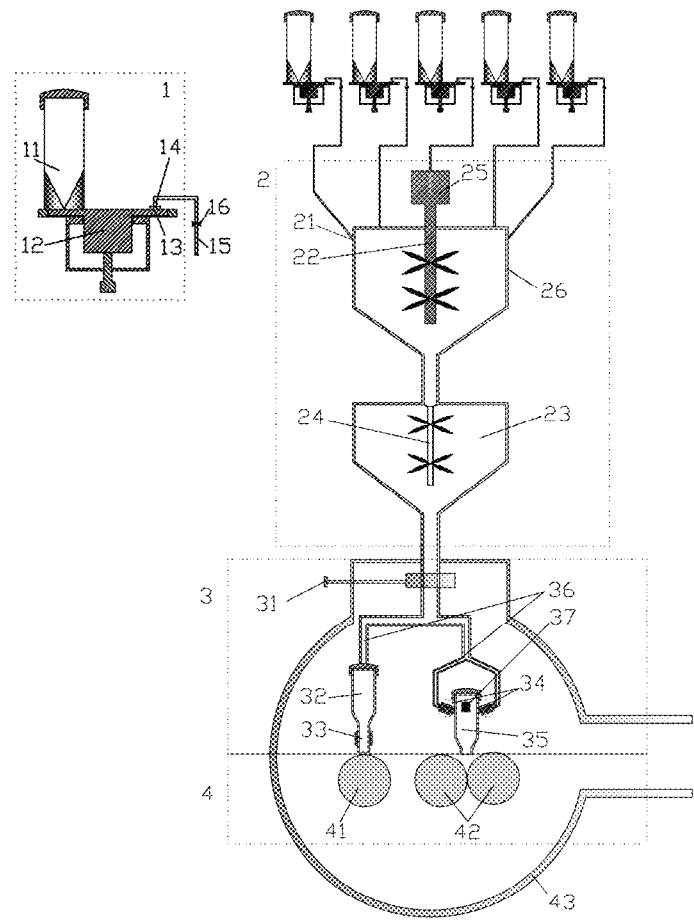
FIG. 1 is a schematic view illustrating a high-throughput preparation device for metal fiber based on multi powder provided by the present application.

In the drawings:
1 metal powder conveying system
2 metal powder mixing system
3 metal powder melting system
4 metal fiber forming system
11 powder cylinder
12 pneumatic motor
13 powder feeding plate
14 powder outlet
15 powder feeding pipe 16 mass flow controller
21 powder inlet
22 rotating blade stirrer
23 powder storing device
24 static mixer
25 motor
26 powder mixer
31 powder melting switching device
32 powder storing chamber
33 induction coil melting chamber
34 induction preheating coil
35 laser melting chamber
36 powder conveying pipe
37 laser device
41 rotary drawing disk
42 rotary extrusion dual disk
43 vacuum protective chamber

DETAILED DESCRIPTION

Solutions of the present application are described more fully below through specific embodiments in connection with the drawings. Those who skilled in the art should understand that the embodiments are merely used for helping to understand the present application and should not be regarded as the specific limitations to the present application.

FIG. 1 is a schematic view illustrating a high-throughput preparation device for metal fiber based on multi powder provided by the present application. A pneumatic motor 12 is connected to a powder feeding plate 13. A powder cylinder 11 is disposed above the powder feeding plate 13. By rotating the powder feeding plate 13, the metal powders in the powder cylinder 11 can be conveyed to a powder outlet 14. The powder outlet 14 and a powder inlet 21 are connected to each other through a powder feeding pipe 15, and a mass flow controller 16 is disposed on the powder feeding pipe 15. The powder inlet 21 is disposed on the upper part of the powder mixer 26. A rotating blade stirrer 22 is disposed in the inner part of the powder mixer 26 and connected to a motor 25. A powder storing device 23 is connected below the powder mixer 26. A static mixer 24 is disposed in the inner part of the powder storing device 23. A powder conveying pipe 36 is connected to the powder mixer 26, is provided with a powder melting switching device 31, and can convey the evenly mixed metal powders to a powder storing chamber 32 or a laser melting chamber 35. The powder storing chamber 32 is connected to a induction coil melting chamber 33 up and down. A rotary drawing disk 41 is disposed below the induction coil melting chamber 33. The powder conveying pipe 36 is wound with a induction preheating coil 34 at a portion where the powder conveying pipe 36 is connected to the laser melting chamber 35. A laser device 37 is disposed in the inner part of the laser melting chamber 35, and a rotary extrusion dual disk 42 is disposed below the laser melting chamber 35. The vacuum protective chamber 43 protects the metal powder melting system 3 and the metal fiber forming system 4 under a vacuum environment, and protects the metal powders from being oxidized during the melting and forming process.

Embodiment 1

The embodiment provides a high-throughput preparation device for metal fiber based on multi powder. As shown in FIG. 1, the pneumatic motor 12 is connected to the powder feeding plate 13, the powder cylinder 11 is disposed above the powder feeding plate 13, the metal powders in the powder cylinder 11 can be conveyed to the powder outlet 14 by rotating the powder feeding plate 13, the powder outlet 14 and the powder inlet 21 are connected to each other through the powder feeding pipe 15, and the mass flow controller 16 is disposed on the powder feeding pipe 15; the powder inlet 21 is disposed on the upper part of the powder mixer 26, the rotating blade stirrer 22 is disposed in the inner part of the powder mixer 26 and connected to the motor 25, the powder storing device 23 are connected below the powder mixer 26, and the static mixer 24 is disposed in the inner part of the powder storing device 23; the powder conveying pipe 36 is connected to the powder mixer 26, is provided with a powder melting switching device 31, and can convey the evenly mixed metal powders to the powder storing chamber 32 or the laser melting chamber 35, the powder storing chamber 32 is connected to the induction coil melting chamber 33 up and down, the rotary drawing disk 41 is disposed below the induction coil melting chamber 33, the powder conveying pipe 36 is wound with the induction preheating coil 34 at a portion where the powder conveying pipe 36 is connected to the laser melting chamber 35, the laser device 37 is disposed in the inner part of the laser melting chamber 35, and the rotary extrusion dual disk 42 is disposed below the laser melting chamber 35; the vacuum protective chamber 43 protects the metal powder melting system 3 and the metal fiber forming system 4 under a vacuum environment, and protects the metal powders from being oxidized during the melting and forming process.

Wherein, 10 pneumatic rotary table powder feeders, each of which is composed of a powder cylinder 11, a pneumatic motor 12, a powder feeding plate 13 and a powder outlet 14, are included, accordingly, 10 powder feeding pipes 15, each of which is provided with a mass flow controller 16, are connected to the 10 pneumatic rotary table powder feeders respectively, and the 10 powder feeding pipes 15 are connected to 10 powder inlets 21 respectively.

The angle between the laser beam emitted by the laser device 37 and a central axis of the inlet of the powder conveying pipe 36 wound with the induction preheating coil 34 is 75°.

Embodiment 2

The embodiment provides a high-throughput preparation device for metal fiber based on multi powder. As shown in FIG. 1, this device differs from that of Embodiment 1 in that:

the angle between the laser beam emitted by the laser device 37 and the central axis of the inlet of the powder conveying pipe 36 wound with the induction preheating coil 34 is 60°.

Application Example 1

The application example provides a method for preparing a metal fiber which uses the high-throughput preparation device for metal fiber based on multi powder described in Embodiment one. The method includes the following steps.

Figure 2:
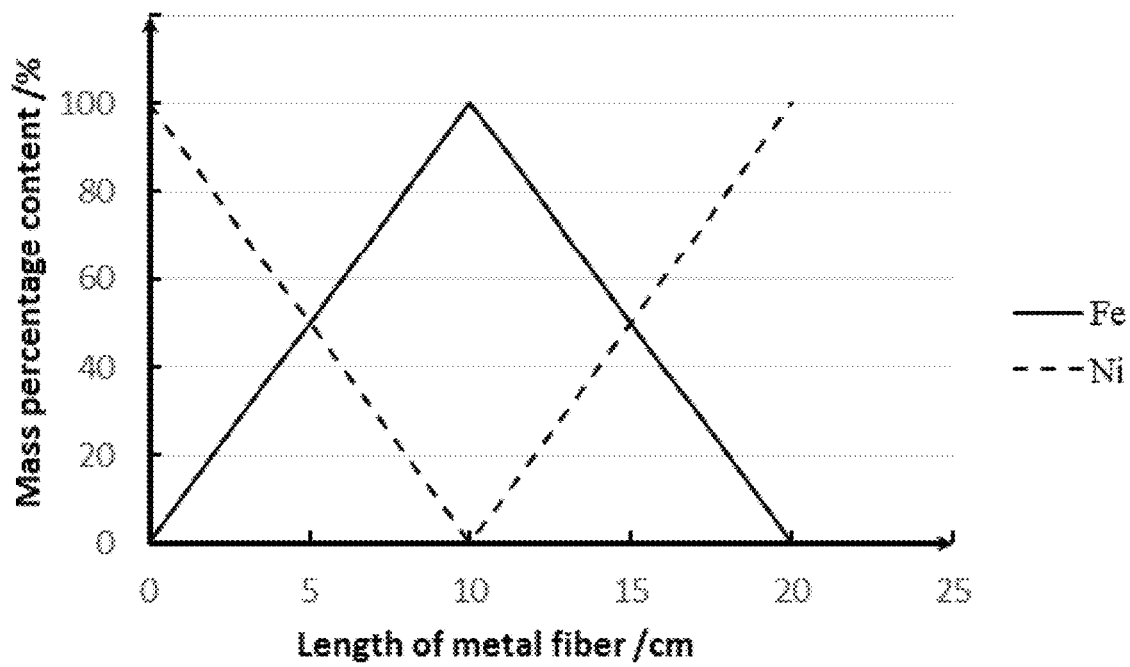
FIG. 2 is a curve graph of preset ratios of a metal fiber corresponding to Application example 1.

(1) In the metal powder conveying system 1, the iron powder with the particle size of 150 μm and the nickel powder with the particle size of 150 μm were added to different powder cylinders 11 respectively. The powder feeding plates 13 rotated with the driving of the pneumatic motors 12, and the metal powders in the each powder cylinder 11 were conveyed to the powder outlets 14 at a powder feeding efficiency of 8 g/min respectively. The metal powders at the each powder outlet 14 were further conveyed to the powder feeding pipes 15 with a mass flow controller 16 respectively by means of the airflow of the shielding gas, i.e. argon. According to preset ratios shown in FIG. 2, corresponding metal powders were conveyed to the metal powder mixing system 2.

(2) In the metal powder mixing system 2, the metal powders from two paths entered the powder mixer 26 through the powder inlets 21 respectively, and were mixed by the rotating blade stirrer 22 driven by the motor 25. The mixed metal powders entered the powder storing device 23 with a static mixer 24 for further mixing. Finally, the evenly mixed metal powders were conveyed to the metal powder melting system 3.

(3) In the metal powder melting system 3, the laser powder melting device was quickly switched to through a valve 31 with a manual lever, and the evenly mixed metal powders were first conveyed to the powder conveying pipe 36 with the induction preheating coil 34 to be preheated to 700° C., and then entered the laser melting chamber 35 to be heated and melted at 1700° C.

(4) In the metal fiber forming system 4, the molten liquid metal was prepared by the rotary extrusion dual disk 42 into a rectangular band-shaped iron-nickel gradient metal fiber with a cross-sectional size of 2 mm².

Application Example 2

The application example provides a method for preparing a metal fiber which uses the high-throughput preparation device for metal fiber based on multi powder described in Embodiment two. The method includes the following steps.

Figure 3:
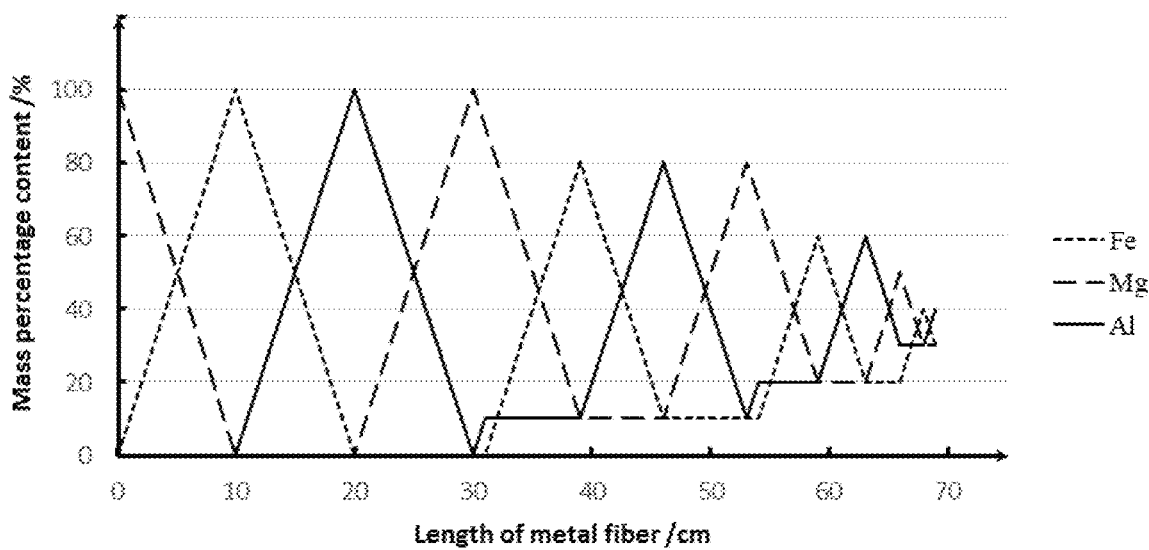
FIG. 3 is a curve graph of preset ratios of a metal fiber corresponding to Application example 2.

(1) In the metal powder conveying system 1, the magnesium powder with the particle size of 100 μm, the aluminum powder with the particle size of 100 μm and the iron powder with the particle size of 100 μm were added to different powder cylinders 11 respectively. The powder feeding plates 13 rotated with the driving of the pneumatic motors 12, and the metal powder in each powder cylinder 11 were conveyed to the powder outlet 14 at the powder feeding efficiency of 2 g/min respectively. The metal powders at the each powder outlet 14 were further conveyed to the powder feeding pipes 15 with a mass flow controller 16 respectively by means of the airflow of the shielding gas, i.e. argon. According to preset ratios shown in FIG. 3, corresponding metal powders were conveyed to the metal powder mixing system 2.

(2) In the metal powder mixing system 2, the metal powders from three paths entered the powder mixer 26 through the powder inlets 21 respectively, and were mixed by the rotating blade stirrer 22 driven by the motor 25. The mixed metal powders entered the powder storing device 23 with a static mixer 24 for further mixing. Finally, the evenly mixed metal powders were conveyed to the metal powder melting system 3.

(3) In the metal powder melting system 3, the induction powder melting device was quickly switched to through a valve 31 with a manual lever, and the evenly mixed metal powders were first conveyed to the powder storing chamber 32, and then entered the induction coil melting chamber 33 to be heated and melted at 1200° C.

(4) In the metal fiber forming system 4, the molten liquid metal was prepared by the rotary drawing disk 42 into a circular wire magnesium-aluminum-iron gradient metal fiber with a cross-sectional size of 3 mm².

It can be seen from Embodiments 1 and 2 and Application examples 1 and 2 that the high-throughput preparation device of the present application not only has the characteristics of simple structure, easy operation, wide melting temperature range and wide application range, but also can realize the high-throughput preparation of the metal fiber with continuous gradient change in composition.

The applicant has stated that although the detailed structure characteristics of the present application are described through the embodiments described above, the present application is not limited to the detailed structure characteristics described above, which means that implementation of the present application does not necessarily depend on the detailed structure characteristics described above.

The optional embodiments of the present application are described above in detail, but the present application is not limited to specific details in the embodiments described above.

In addition, it is to be noted that if not in collision, the specific technical features described in the above specific embodiments may be combined in any suitable manner. In order to avoid unnecessary repetition, the present application does not further specify any of various possible combination manners.

What is claimed is:

1. A high-throughput preparation device for metal fiber based on multi powder, comprising a metal powder conveying system, a metal powder mixing system, a metal powder melting system and a metal fiber forming system which are connected in sequence;
wherein the metal powder melting system comprises an induction powder melting device and a laser powder melting device which are independently disposed; and
wherein the induction powder melting device comprises a high frequency induction coil, a powder storing chamber, and an induction coil melting chamber.

2. The high-throughput preparation device of claim 1, wherein the metal powder conveying system comprises a plurality of single-channel powder conveying devices.

3. The high-throughput preparation device of claim 1, wherein the metal powder mixing system comprises a powder mixing device and a powder storing device which are connected in sequence.

4. The high-throughput preparation device of claim 3, wherein a powder inlet of the powder mixing device and a powder outlet of the metal powder conveying system are connected through a powder feeding pipe.

5. The high-throughput preparation device of claim 4, wherein a mass flow controller is disposed on the powder feeding pipe.

6. The high-throughput preparation device of claim 1, wherein the metal powder mixing system and the metal powder melting system are connected through a powder conveying pipe.

7. The high-throughput preparation device of claim 6, wherein a powder melting switching device is configured to implement switching between the induction powder melting device and the laser powder melting device.

8. The high-throughput preparation device of claim 1, wherein the metal fiber forming system comprises a vacuum protective chamber, a servo motor, a mandrel, a rotary forming disk and a cooling system.

9. The high-throughput preparation device of claim 1, wherein a mass flow controller is configured to implement feedback control of a powder feeding amount of the metal powder conveying system.

10. The high-throughput preparation device of claim 9, wherein the mass flow controller has a precision of ±0.1 g/min.

11. The high-throughput preparation device of claim 1, wherein the laser powder melting device comprises a laser melting chamber and a laser device.

12. The high-throughput preparation device of claim 11, wherein a laser beam emitted by the laser device is a continuously tunable laser beam.

13. The high-throughput preparation device of claim 11, wherein an angle between a laser beam emitted by the laser device and a central axis of an inlet of a powder conveying pipe is 50° to 80°.

14. The high-throughput preparation device of claim 1, wherein an induction preheating coil is disposed on a powder conveying pipe connected to the laser powder melting device.

15. A method for preparing a metal fiber using the high-throughput preparation device of claim 1, comprising steps of:
   (1) conveying metal powders of various components to the metal powder mixing system in preset ratios through the metal powder conveying system;
   (2) mixing the metal powders evenly in the metal powder mixing system and conveying the evenly mixed metal powders to the metal powder melting system;
   (3) in the metal powder melting system, melting the evenly mixed metal powders using the induction powder melting device or the laser powder melting device, and conveying the molten metal obtained by the melting to the metal fiber forming system; and
   (4) preparing the molten metal into a metal fiber with a gradient change in composition through the metal fiber forming system.

16. The preparation method of claim 15, wherein the metal powder in step (1) has a particle size ranging from 50 μm to 200 μm.

17. The preparation method of claim 15, wherein the melting the evenly mixed metal powders using the induction powder melting device in step (3) comprises: conveying the evenly mixed metal powders to the powder storing chamber, and conveying the evenly mixed metal powders to the induction coil melting chamber for heating and melting.

18. The preparation method of claim 15, wherein the melting the evenly mixed metal powders using the laser powder melting device in the step (3) comprises: conveying the evenly mixed metal powders to a powder conveying pipe of an induction preheating coil for preheating, and conveying the preheated metal powders to a laser melting chamber for heating and melting.

19. The preparation method of claim 15, wherein the metal powder conveying system in step (1) has a powder feeding efficiency of 2 g/min to 10 g/min.

* * * * *